United States Patent
Shin et al.

(10) Patent No.: US 10,657,926 B2
(45) Date of Patent: May 19, 2020

(54) MOBILE TERMINAL AND METHOD OF CONTROLLING THE SAME

(71) Applicant: LG ELECTRONICS INC., Seoul (KR)

(72) Inventors: Minkyoung Shin, Seoul (KR); Yunmi Kwon, Seoul (KR); Nayeoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 15/828,287

(22) Filed: Nov. 30, 2017

(65) Prior Publication Data
US 2018/0342226 A1 Nov. 29, 2018

(30) Foreign Application Priority Data
May 26, 2017 (KR) .................. 10-2017-0065458

(51) Int. Cl.
*G09G 5/14* (2006.01)
*G06F 1/16* (2006.01)
(Continued)

(52) U.S. Cl.
CPC .............. *G09G 5/14* (2013.01); *G06F 1/1616* (2013.01); *G06F 1/1641* (2013.01);
(Continued)

(58) Field of Classification Search
CPC .. G09G 5/14; G09G 2340/04; G09G 2354/00; G06F 1/1641; G06F 1/1677;
(Continued)

(56) References Cited

U.S. PATENT DOCUMENTS

| 8,842,090 B1 * | 9/2014 | Cho ................. G06F 3/0412 345/173 |
| 9,348,362 B2 * | 5/2016 | Ko .................... G06F 1/1626 |

(Continued)

FOREIGN PATENT DOCUMENTS

| EP | 2977850 | 1/2016 |
| EP | 2998851 | 3/2016 |
| JP | 2004235865 | 8/2004 |

OTHER PUBLICATIONS

European Patent Office Application Serial No. 18167887.1, Search Report dated Oct. 2, 2018, 9 pages.

*Primary Examiner* — Amare Mengistu
*Assistant Examiner* — Crystal Mathews
(74) *Attorney, Agent, or Firm* — Lee Hong Degerman Kang & Waimey

(57) ABSTRACT

According to one embodiment, there is provided a mobile terminal including a terminal body that includes a first body and a second body, which is formed to be switchable between an opened state and a close state; a hinge unit that supports the first and second bodies to be rotated relative to each other; and a display unit that includes an inside-surface display area s, and first and second extension display areas, in which information associated with a first screen is displayed on any one of the first and second extension display areas, in which an icon which indicates that the first and second extension display area are combinable is displayed along with information associated with the first screen, and in which the information associated with the first screen is changed and the changed information is displayed on a combined extension display area.

5 Claims, 20 Drawing Sheets

(51) Int. Cl.

| | |
|---|---|
| *G06F 3/0488* | (2013.01) |
| *G06F 3/0484* | (2013.01) |
| *G06F 3/0487* | (2013.01) |
| *G06F 3/01* | (2006.01) |
| *H04M 1/02* | (2006.01) |
| *G06F 3/0481* | (2013.01) |
| *H04M 1/725* | (2006.01) |
| *G06F 16/248* | (2019.01) |

(52) U.S. Cl.
CPC .......... *G06F 1/1677* (2013.01); *G06F 1/1681* (2013.01); *G06F 3/017* (2013.01); *G06F 3/0487* (2013.01); *G06F 3/04845* (2013.01); *G06F 3/04883* (2013.01); *G06F 16/248* (2019.01); *H04M 1/0214* (2013.01); *H04M 1/0245* (2013.01); *H04M 1/0266* (2013.01); *G06F 3/04817* (2013.01); *G06F 2203/04803* (2013.01); *G09G 2330/021* (2013.01); *G09G 2340/04* (2013.01); *G09G 2354/00* (2013.01); *H04M 1/0268* (2013.01); *H04M 1/72583* (2013.01)

(58) Field of Classification Search
CPC ............... G06F 1/1681; G06F 3/04845; G06F 3/04883; G06F 3/04817; G06F 2203/04803
See application file for complete search history.

(56) References Cited

U.S. PATENT DOCUMENTS

| | | | |
|---|---|---|---|
| 2012/0262367 A1* | 10/2012 | Chiu | G06F 1/1626 345/156 |
| 2013/0033434 A1* | 2/2013 | Richardson | G06F 3/0488 345/173 |
| 2013/0178248 A1* | 7/2013 | Kim | H04M 1/0268 455/566 |
| 2014/0132481 A1* | 5/2014 | Bell | H05K 5/0017 345/1.3 |
| 2014/0267091 A1* | 9/2014 | Kim | G06F 1/1652 345/173 |
| 2016/0187994 A1 | 6/2016 | La et al. | |

\* cited by examiner

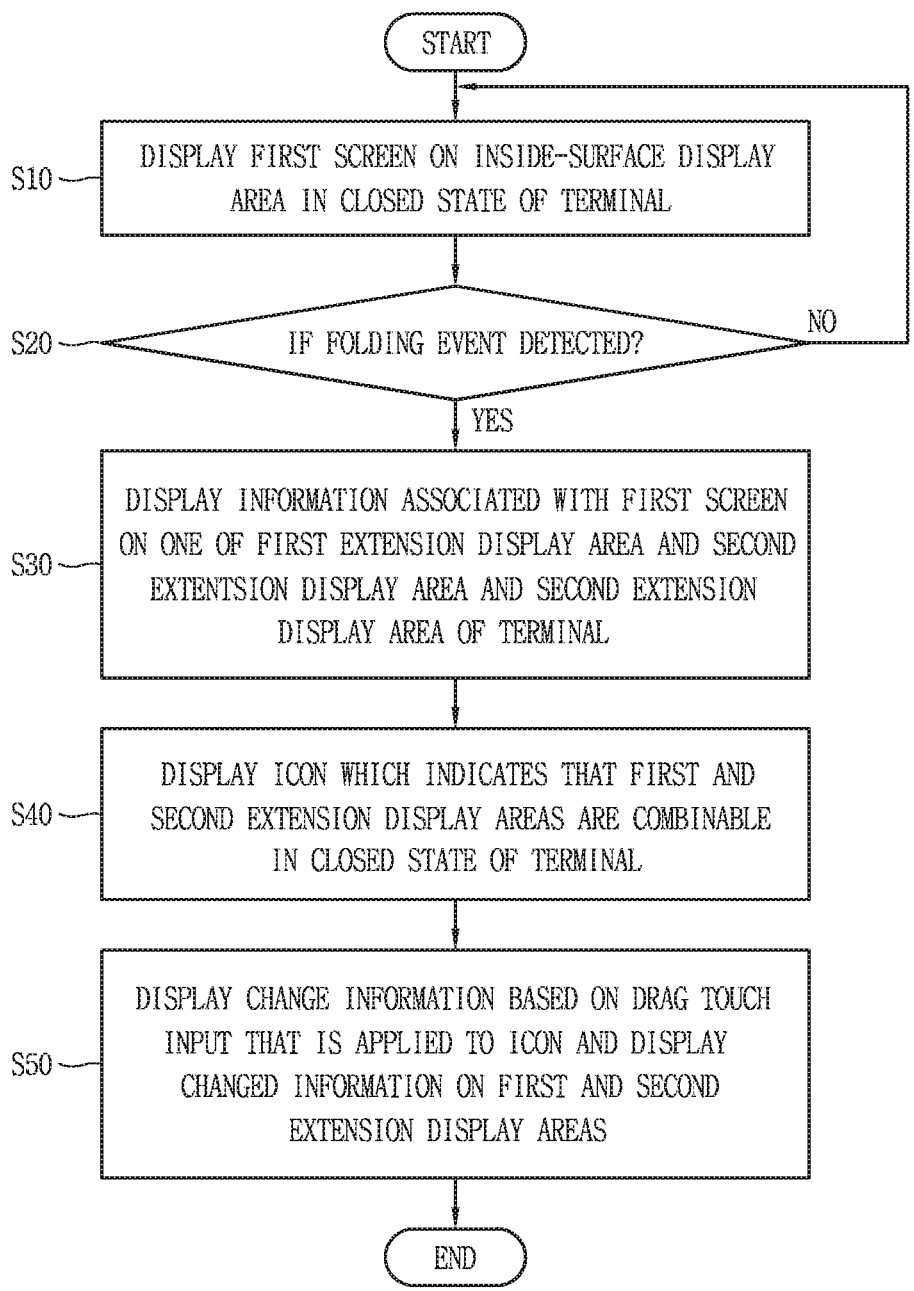

FIG. 10A
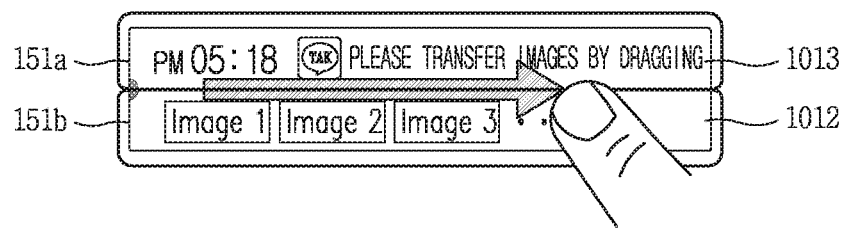
FIG. 10B
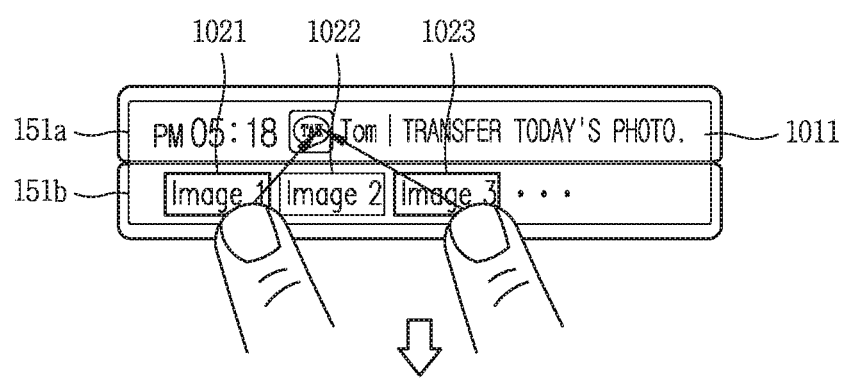
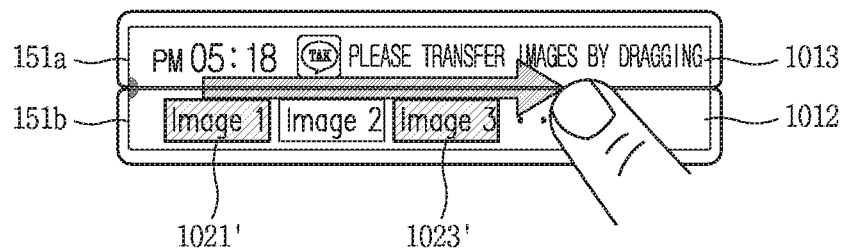

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2017-0065458, filed on May 26, 2017, the contents of which are incorporated by reference herein in its entirety.

BACKGROUND OF THE DISCLOSURE

1. Field of the Disclosure

The present disclosure relates to a mobile terminal that is capable of being folded and a method of controlling the mobile terminal.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

In addition, a mobile terminal can be structurally configured to switch between a folded state and an unfolded state in a variously-transformed manner. In this case, if information is output to an external flank surface of the terminal in the folded state, the inconvenience of not easily identifying the information occurs due to limitation on a size of a display area. In addition, there occur the inconvenience of opening the folded terminal to perform a specific function and a problem of high power consumption.

SUMMARY OF THE DISCLOSURE

Therefore, an aspect of the detailed description is to provide a mobile terminal that is capable of providing useful information in an identifiable size even in a state where the foldable mobile terminal itself is closed, and a method of controlling the mobile terminal.

Another aspect of the detailed description is to provide a mobile terminal that is capable of performing a function associated with information that is output, intuitively and immediately while minimizing battery power consumption, even in a state where the foldable mobile terminal itself is closed, and a method of controlling the mobile terminal.

To achieve these and other advantages and in accordance with the purpose of this specification, as embodied and broadly described herein, there is provided a mobile terminal including: a terminal body that includes a first body and a second body, which is formed to be switchable between an opened state where inside surfaces of the first body and the second body are exposed to view and a close state where the inside surfaces are covered; a hinge unit that connects the first and second bodies to each other and supports the first and second bodies to be rotated relative to each other; a display unit that includes an inside-surface display area which is positioned on the inside surfaces of the first and second bodies, and first and second extension display areas which extend from the inside-surface display area and which are arranged on external flank surfaces of the first and second bodies; and a controller that controls the display unit in such a manner that information associated with a first screen is displayed on any one of the first and second extension display areas, when a folding event is detected while the first screen is output to the inside-surface display area in the closed state.

In the mobile terminal, when the first and second extension display areas come into proximity with each other in the closed state, the controller may control the display unit in such a manner that an icon which indicates that the first and second extension display areas are combinable is displayed along with information associated with the first screen. Furthermore, when a drag touch input applied to the icon, the controller may control the display unit in such a manner that the information associated with the first screen is changed and the changed information is displayed on a combined extension display area.

In the mobile terminal, the icon which indicates that the combination is possible may be generated on a border of the first and second display areas and may be transformed along a drag path of the drag touch input for display.

In the mobile terminal, the controller may control the display unit in such a manner that a display position and a size of the information associated with the first screen vary around the border of the first and second extension display areas, when the first and second extension display areas are combined based on the drag touch input.

In the mobile terminal, when the drag touch input is applied in a state where partial information in a first group associated with the first screen is displayed on each of the first and second extension display areas, the controller may vary any one of pieces of partial information according to designated order and display the varied partial information on the combined extension display area, and may vary next partial information in the first group for display, based on a preset touch gesture that is made toward the combined extension display area.

In the mobile terminal, when an opening event is detected in a state where the changed information is displayed on the combined extension display area, the controller may control the display unit in such a manner that the combined extension display area is separated, the changed information is restored to its initial state for display on any one of the first and second extension display areas.

In the mobile terminal, the information associated with the first screen may vary gradually along a drag path of the drag touch input.

In the mobile terminal, the controller may control the display unit in such a manner that the changed information is restored to its initial state for display on any one of the first and second extension display areas, when a second drag touch input in a direction that is opposite to a direction of the drag touch input is applied in a state where the changed information is displayed on the combined extension display area, and a second icon that includes an image which varies along a drag path of the second drag touch input may be displayed while the second drag touch input is performed.

In the mobile terminal, when a drag touch input that divides the first and second extension display areas in the column direction is applied, the information and additional information may be output to multiple sub-display areas that result from the division, respectively, in a distributed manner.

In the mobile terminal, when the drag touch input is applied in a state where partial information in a first group associated with the first screen is displayed on each of the first and second extension display areas, the controller may perform a function associated with integration of pieces of partial information in the first group, and may provide a result of performing the function to the combined extension display area.

In the mobile terminal, when the drag touch input is applied to an area on which first information is displayed in a state where the first information associated with the first screen is displayed on the first extension display area, the display unit may be controlled in such a manner that, an execution command that is included in the first information is recognized and a search result associated with execution of the recognized execution command is provided to the second extension display area, and when the drag touch input is applied, the display unit may be controlled in such a manner that the execution command is executed using the provided search result and a result of the execution of the execution command is output to the combined display area.

In the mobile terminal, in a case where multiple search results associated with the execution of the recognized execution command are provided in the second extension display area, the controller may execute the execution command of only the search result that is selected based on a touch input that is applied to the second extensions display area.

In the mobile terminal, when the drag touch input is additionally applied to the first and second extension display areas in a state where the varied information is displayed on the combined extension display areas, a designaged function of an application that corresponds to the first screen may be performed on the varied information.

In the mobile terminal, while the designated function is performed, when a second drag touch input in a direction that is opposite to a direction of the drag touch input is applied to the combined extension display area, the display unit may be controlled in such a manner that the performing of the designated function is canceled and a graphic object which indicates that the combined extension display area is separated is output.

In the mobile terminal, in a case where multiple images that belong to a first group are displayed on the first and second display areas, while a touch input is applied to a specific image among the multiple images, the controller may partly combine the first and second display areas around an area on which the specific image is displayed and may provide the varied specific image to a partly-combined extension display area.

In the mobile terminal, the controller may detect relative rotation speeds of the first and second bodies that correspond to the folding event, determine an amount of information associated with the first screen differently according to the detected relative rotation speeds, vary the amount of information according to the drag touch input, and provide the varied amount of information to the combined extension display area.

In the mobile terminal, when a second drag touch input in a direction that is opposite to a direction of the drag touch input is applied within a predetermined time after the folding event occurs, the controller may switch to a sleeping mode while separating the combined display area.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 5 is a flowchart for describing a representative operation that is realized in the mobile terminal according to the present invention;

FIGS. 6A to 6D, FIGS. 7A to 7D, FIGS. 8A and 8B, FIGS. 9A to 9C, FIGS. 10A and 10B, FIGS. 11A to 11E, and FIGS. 12A to 12D are conceptional diagrams for describing various embodiments associated with combination of extension display areas or separation of a combined extension display area that uses a touch input in the mobile terminal according to the present invention;

DETAILED DESCRIPTION OF THE DISCLOSURE

Figure 1:
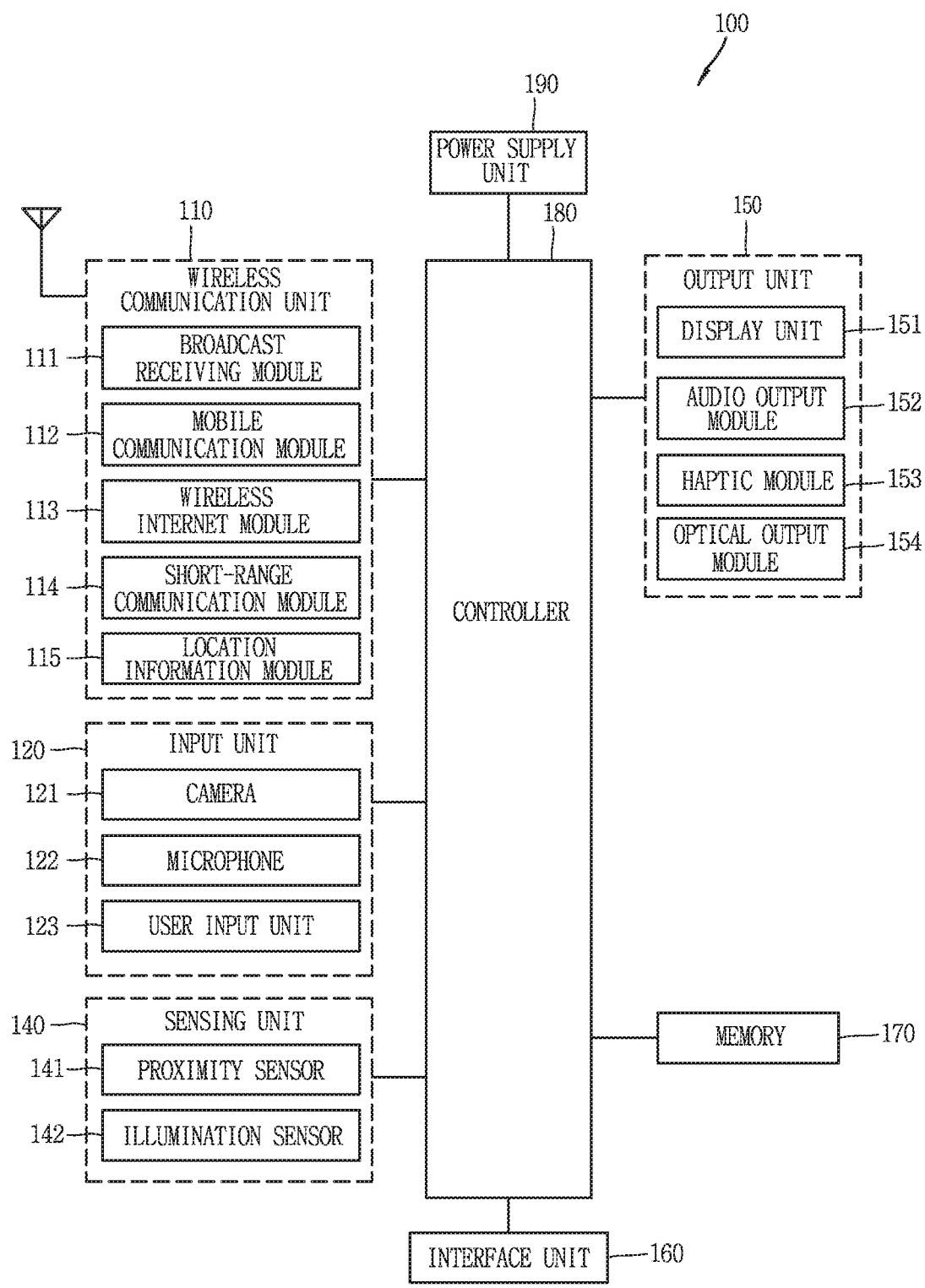
FIG. 1 is a block diagram for describing a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram for describing a mobile terminal according to the present invention.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

In addition, the display unit 151 according to the present invention can be configured to be transformable by an external force. The transformation can be at least one among warping, bending, folding, twisting, and rolling of the display unit 151. The transformable display unit 151 can be named as a "flexible display unit."Flexible display units 151 here can include a general-purpose flexible display, an electronic paper (e-paper), and a combination of the two.

The general flexible display refers to a display that maintains characteristics of an existing flat display, but is lightweight and is not easy to break. This is because the general flexible display is manufactured using a thin, flexible substrate which, like a sheet of paper, is capable of being warped, bent, folded, twisted, and rolled.

In addition, the electronic paper results from a display technology to apply characteristics of general ink, and is different from the existing flat display in that reflection light is used. Information on the electronic paper can be changed using a twist ball or using electrophoresis that uses a capsule.

A display area of the flexible display unit 151 is a flat plane in a state (for example, a state where the flexible display unit 151 has an infinite radius of curvature) (which is hereinafter referred to as a first state) where the flexible display unit 151 is not transformed. The display area can be a curved surface in a state (for example, a state where the flexible display unit 151 has a finite radius of curvature) (which is hereinafter referred to a second state) where the flexible display unit 151 is transformed by the external force. As illustrated, information that is displayed in the second state can be visual information that is output on a curved surface. The visual information is realized as a result of independently controlling light emission by sub-pixels that are arranged in matrix form. The sub-pixel means a minimum unit for realizing one color.

The flexible display unit 151 can switch from the first state to a bent state (for example, a vertically- or horizontally-bent state) that is not a flat state. In this case, when the external force is applied to the flexible display unit 151, the flexible display unit 151 can be transformed to be in the flat state (or in a less-bent state) or in a much-bent state.

On the other hand, the flexible display unit 151 can realize a flexible touch screen in combination with a touch sensor. When a touch is applied to the flexible touch screen, a controller 180 (refer to FIG. 1) can perform control that is equivalent to this touch input. The flexible touch screen can be configured to detect the touch input in the second state as well as in the first state.

On the other hand, the mobile terminal 100 according to the present modification example can include a transformation detection unit that can detect the transformation of the flexible display unit 151. These transformation detection units can include a sensing unit 140 (refer to FIG. 1).

The transformation detection unit is provided in the flexible display unit 151 or a case 101, and can detect information associated with the transformation of the flexible display unit 151. Pieces of information associated with the transformation here can include a direction in which the flexible display unit 151 is transformed, the extent to which the flexible display unit 151 is transformed, a position at which the flexible display unit 151 is transformed, a time when the flexible display unit 151 is transformed, acceleration of the transformation of the flexible display unit 151, and the like. In addition to these, the pieces of information associated with the transformation here can include various pieces of information that are detectable due to the warping of the flexible display unit 151.

In addition, based on the information associated with the transformation of the flexible display unit 151 that is detected by the transformation detection unit, the controller 180 can change information that is displayed on the flexible display unit 151, or generate a control signal for controlling a function of the mobile terminal 100.

On the other hand, the mobile terminal 100 according to the present modification example can include a case that accommodates the flexible display unit 151. The case can be configured to be transformable by the external force together with the flexible display unit 151, considering characteristics of the flexible display unit 151.

In addition, the case can be configured to be transformable by the external force together with the flexible display unit 151, considering a battery (not illustrated) that is provided in the mobile terminal 100, or the characteristics of the flexible display unit 151. In order to realize the battery, a stack and folding method can be applied in which battery cells are stacked on top of each other.

The state transformation of the flexible display unit 151 is not limited to the external force. For example, when the flexible display unit 151 is in the first state, the flexible display unit 151 can switch to the second state for transformation, under the command of a user or an application.

Embodiments associated with a method of controlling the mobile terminal that is configured in this manner will be described below with reference to the accompanying drawings. It is apparent to a person of ordinary skill in the art that specific embodiments of the present invention can be implemented within the scope that does not depart from the nature and gist of the present invention.

Figure 2A:
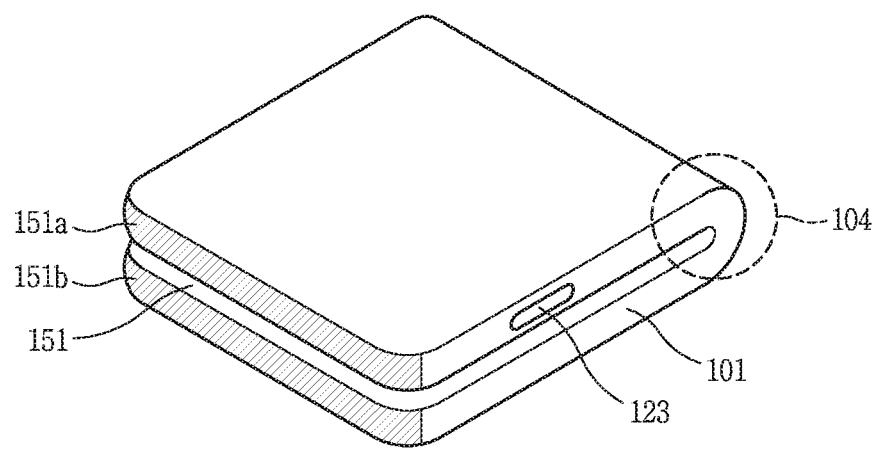
FIGS. 2A, 2B, and 2C are conceptual diagrams each illustrating an example in which the mobile terminal according to the present invention is folded or opened, when viewed from different directions.
Figure 2B:
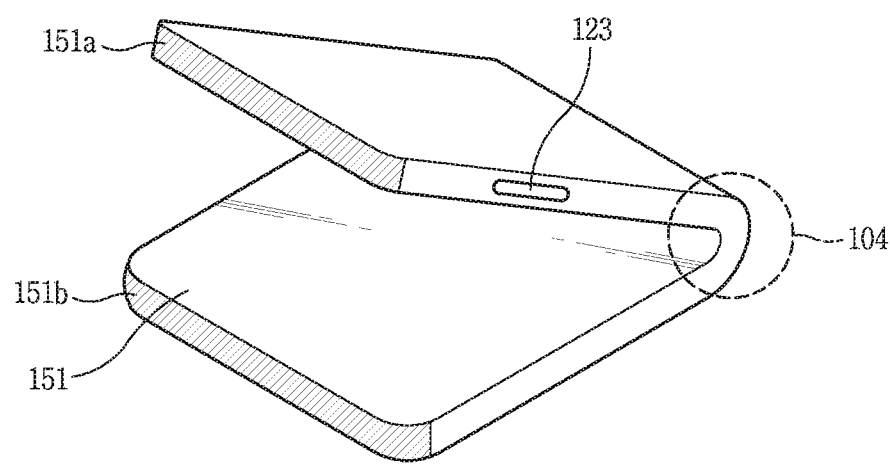
Figure 2C:
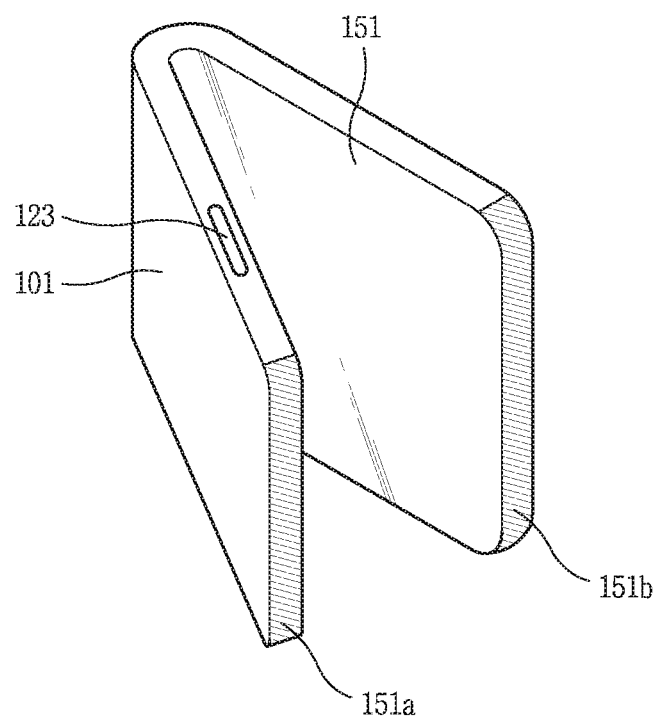

FIGS. 2A, 2B, and 2C are conceptual diagrams, each illustrating an example in which the mobile terminal according to the present invention is folded or opened, when viewed from different directions, which will be described below.

First, with reference to FIG. 2A, a main body of the mobile terminal according to the present invention includes first and second bodies 101, and includes a hinge unit 104 that connects the first and second bodies 101 to each other and supports the first and second bodies 101 to be rotatable relative to each other.

The first and second bodies 101 are rotated about the hinge unit 104 relative to each other, and thus it is possible that an opened state where at least one portion of the inside surface is exposed to view or a closed state where the inside surface is all covered is realized. FIG. 2A illustrates the closed state of the mobile terminal 100.

In the closed state, a first extension display area 151a that is positioned in the first body and a second extension display area 151b that is positioned in the second body, are brought into contact with each other. The first extension display area 151a and the second extension display area 151b extend from the inside-surface display area 151. In addition, the display unit 151 can be accommodated in the first and second bodies 101.

In order to be distinguished from the first and second extension display areas 151A and 151B, s display area that is positioned on the inside surfaces of the first and second bodies 101 is hereinafter named as an inside-surface display area. In addition, the inside-surface display area is given the same numeral reference as the display unit 151 described above. In addition, the display unit collectively refers to the inside-surface display area 151 and the first and second extension display areas 151A and 151B.

With reference again to FIG. 2A, a user input unit 123 can be provided in the other external flank surface of the first body. In addition, although not illustrated, another user input unit may be provided in the other external flank surface of the second body and/or the rear surfaces of the first and second bodies.

At least one side of a terminal body (the first and second bodies 101) in the form of a folder according to the embodiment of the present invention can be formed to be folded or unfolded. As illustrates in FIG. 2A, the closed state (closed configuration)" refers to a state where the first body and the second body are arranged to be laid over each other in an overlapping manner, that is, a state where the first and second bodies are brought into contact with each other with the hinge unit 104 serving as an axis. In the closed state, the first and second bodies are arranged to face each other, and the first and second extension display areas 151A and 151B are arranged to come into proximity with each other.

The first and second extension display areas 151A and 151B extend from the inside-surface display area 151 that is positioned on the inside surfaces of the first and second bodies, respectively.

FIGS. 2B and 2C illustrate a partly-opened state of the mobile terminal 100 according to the present invention. In the closed state in FIG. 2A, at least one of the first and second bodies is rotated about the hinge unit 104 relative to each other, and thus the mobile terminal 100 can be opened. That is, when the first and second bodies are rotated about the hinge unit 104 relative to the each other, the inside-surface display area 151 is folded or unfolded.

In addition to a support unit that supports the relative rotation of the first and second bodies, sensors that detect a speed or pressure of the relative rotation can be provided in the hinge unit 104. In addition, the hinge unit 104 supports the folding at a specific angle within a range of 0 to 180 degrees depending on a structure of the mobile terminal 100 or within a range of 0 to 360 degrees depending on a structure of the hinge unit.

In addition, the mobile terminal 100 can further include a case (a casing, a housing, a cover, or the like) that constitutes external appearances of the first and second bodies 101. In the present embodiment, the case can be divided into a front case and a rear case. At this point, various electronic components are built into a space between the front case and the rear case. At least one middle case may be positioned between the front case and the rear case.

The case may be formed as a result of injecting synthetic resin into a mold. Alternatively, a metal material, for example, such as stainless steel (STS) or titanium (Ti) may be formed into the case. In addition, the display units 151, 151A, and 151B can form a touch screen together with the touch sensor, in which case the touch screen can function as the user input unit 123.

According to the present invention, the "opened state" means a state where the inside surface of the terminal is exposed to view, that is, a state where the inside-surface display area 151 is unfolded partly or wholly with the hinge unit 104 serving as an axis and thus is exposed to view at the front surface. This is analogous to opening a book. In this manner, the "opened states" include a backward-bent state in which the inside-surface display area 151 is bent backward with the hinge unit 104 serving as an axis, as well as a state where the inside-surface display area 151 is flatly unfolded.

In addition, according to the present invention, a "folding event," or a bending event" means that, in a state where the mobile terminal 101 is completely unfolded or partly opened, the first and second bodies are rotated about the hinge unit 104 relative to each other and thus at least one portion of the inside-surface display area 151 is folded.

In addition, according to the present invention, a "combined extension display area," means multiple extension display areas that are used like one screen in terms of a method of displaying information, in a state where the first and second extension display areas come into proximity with each other. Accordingly, the combined extension display area remains structurally separated, but information is displayed or controlled in a manner that is suitable for the combined area. That is, this means that information which is displayed only on one of the first and second display areas varies in size and thus is output over both the first and second extension display areas. In addition, this means that a first portion of the information that is output only to any one of the first and second extension display areas and a second portion, the other portion, are output to the first extension display area and the second extension display area, respectively, in a distributed manner.

In reverse, "separation of the combined extension display area" means that the information that is output over both the first and second extension display areas is output to any one of the first and second extension display areas. In addition, this can mean that the information of which the first portion and the second portion are output to the first extension display area and the second extension display area, respectively, in a distributed manner, is reduced in size, and thus is output to any one of the first and second extension display areas.

Figure 3A:
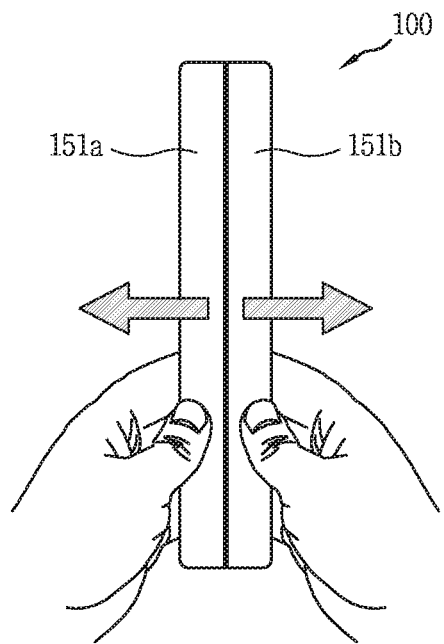
FIGS. 3A, 3B, 3C, and 3D are conceptual diagrams, each illustrating an example in which the mobile terminal according to the present invention, which is folded, is opened in different directions.
Figure 3B:
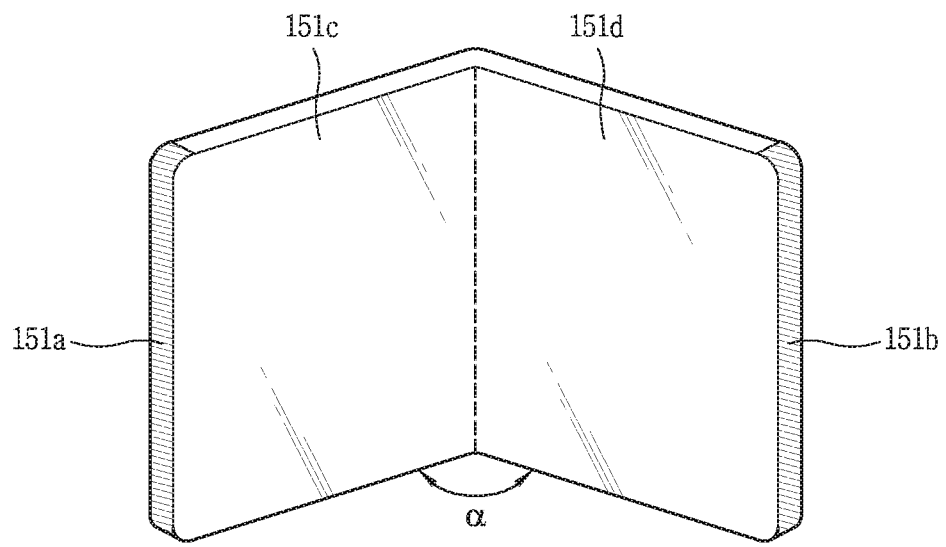
Figure 3C:
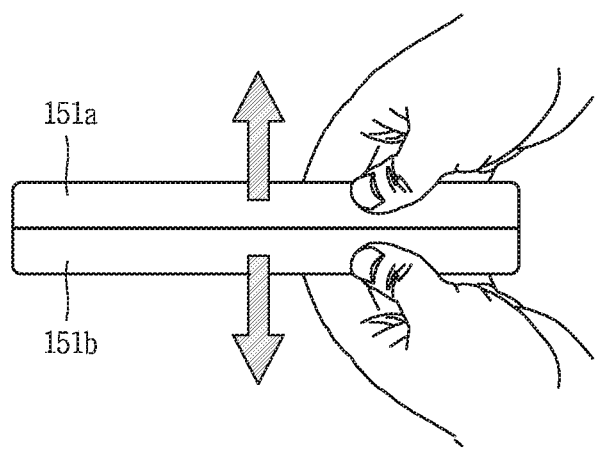
Figure 3D:
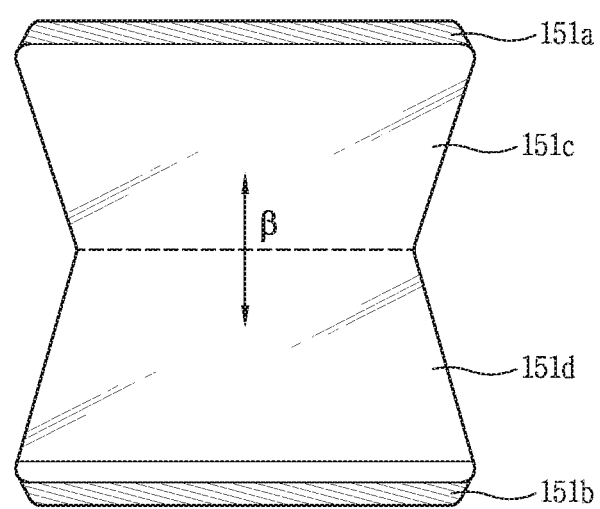

FIGS. 3A, 3B, 3C, and 3D are conceptual diagrams, each illustrating an example in which the mobile terminal according to the present invention, which is in the folded or closed state, is opened in different directions. FIGS. 3A and 3B illustrate that the mobile terminal in the closed state is opened in the transverse direction, and FIGS. 3C and 3D illustrate that the mobile terminal in the closed state is opened in the longitudinal direction.

In FIGS. 3A and 3B, as a horizontally-pushing force is exerted on the first and second bodies, the first and second extension display areas 151A and 151B that are in proximity with each other are moved away from each other. Thus, the mobile terminal 100 is opened. The inside-surface display area 151 that is exposed to view is shown to be divided in the folded manner into the left and right areas 151c and 151d that are horizontally symmetrical about the hinge unit, and when the mobile terminal 100 is completely opened, the inside-surface display area 151 is flattened.

In FIGS. 3C and 3D, as a vertically-pushing force is exerted on the first and second bodies, the first and second extension display areas 151A and 151B that are in proximity with each other are moved away from each other. Thus, the mobile terminal 100 is opened. The inside-surface display area 151 that is exposed to view is shown to be divided in the folded manner into the upper and lower areas 151c and 151d that are vertically symmetrical about the hinge unit, and when the mobile terminal 100 is completely opened, the inside-surface display area 151 is flattened.

Embodiments associated with a method of controlling the mobile terminal that is configured in this manner will be described below with reference to the accompanying drawings. It is apparent to a person of ordinary skill in the art that specific embodiments of the present invention can be implemented within the scope that does not depart from the nature and gist of the present invention.

Figure 4:
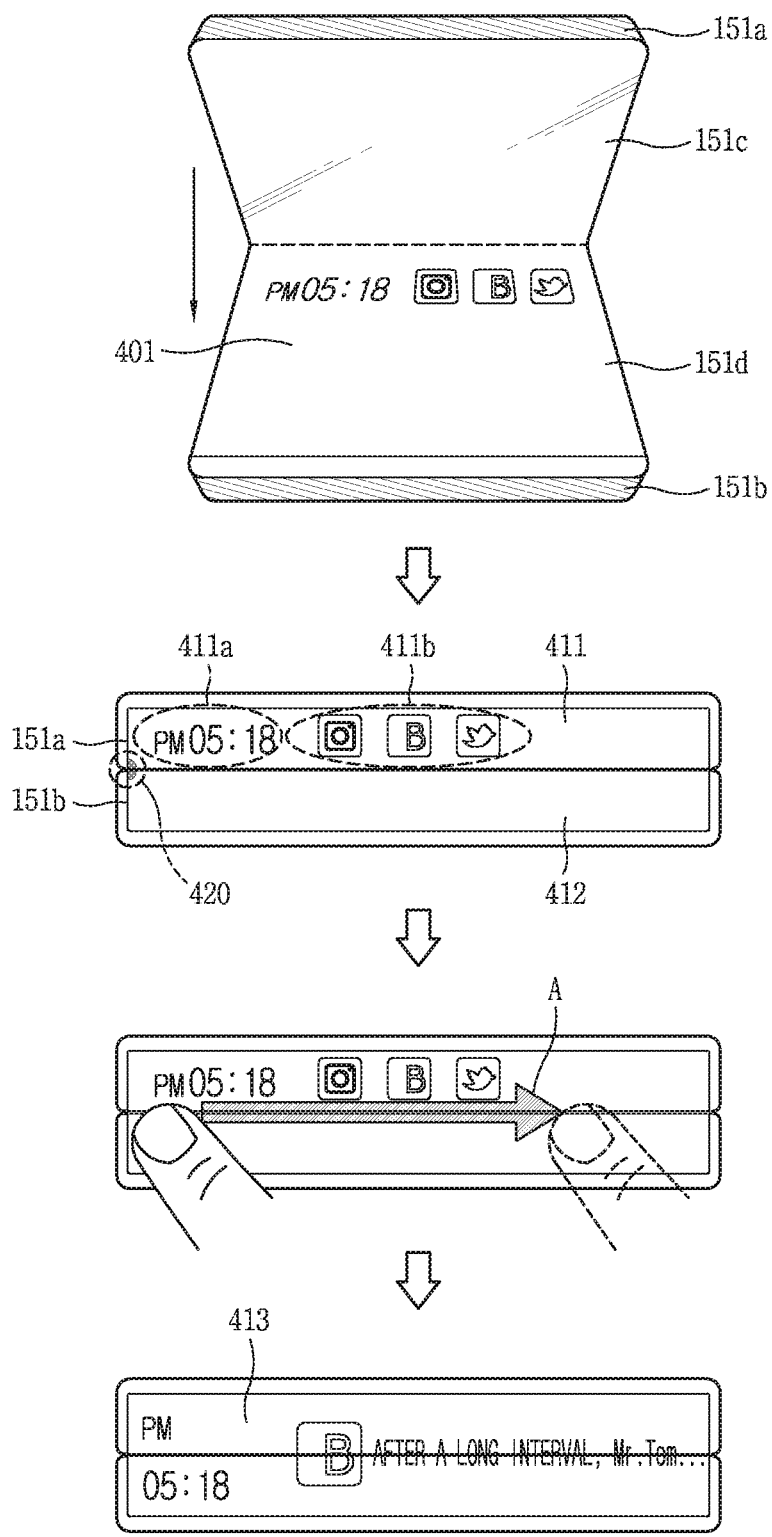
FIG. 4 is conceptual diagrams for describing a representative operation that is realized in the mobile terminal according to the present invention.

FIG. 4 is conceptual diagrams for describing a representative operation that is realized in the mobile terminal according to the present invention.

In a state where the mobile terminal 100 is partly opened, the inside-surface display area 151 that is exposed to view can be divided in the folded manner into both areas, the upper and lower areas 151C and 151D. An execution screen, content, a home screen, or the like can be output to a first screen 401 in both areas, the upper and lower areas 151C and 151D. At this time, execution screens of different applications may be output to both the areas 151C and 151D, respectively, in a distinguished manner, or one execution screen may be output over both the areas 151C and 151D.

In addition, although not illustrated, even in the state where the mobile terminal 100 is partly opened, a portion of the first screen or predetermined information (for example, time information, weather information, event information, or the like) can be displayed at least one of the first and second extension display areas 151A and 151B.

In this state, when a folding event occurs in which the first and second bodies of the mobile terminal 100 are further rotated about the hinge unit relative to each other, information 411 associated with the first screen 401 appears in at least one of the first and second extension display areas 151A and 151B that are exposed to view at external flank surfaces of the first and second bodies, for example, in the first extension display area 151a.

At this point, the information 411 associated with the first screen can include an icon 411B for an application that corresponds to one portion of the first screen or the first screen, event information associated with the first screen, and an operation state of the first screen. In addition, in addition to the information 411 associated with the first screen, designated information (for example, time information 411A) can be displayed on the first extension display area 151A.

After the occurrence of the folding event, when the mobile terminal 100 is in the closed state, as illustrated in FIG. 4, the first and second extension display areas 151A and 151B are formed to come into proximity with each other. Then, an icon 420 for combining the extension display areas is generated in a border of the first and second extension display areas 151A and 151B.

The icon 420 is indicated by a black semicircle image in FIG. 4, but is not limited to this. For example, a zipper image or an arrow image that guides the user through drag input is substituted. In addition, a position of the icon 420 can be displayed in front of a position to which the information is output in the first extension display area 151A for the first time or can be generated in rear of a position to which the information is output for the last time. This is because it is desirable that at least the combination of the separation of the extension display areas or the separation of the combined extension display area is performed over an entire range where the information is output. From FIG. 4, it can be seen that the icon 420 is generated in front of the time information 411A, more specifically, at the left-side end of the border of the first and second extension display areas 151A and 151B.

On the other hand, in a case where the folding event occurs and then the mobile terminal 100 switches to the closed state, the information 411 associated with the first screen may appear after the mobile terminal 100 switches to the closed state.

Next, when touch input is dragged toward the direction in which the information 411B associated with the first screen is displayed (A), the first and second extension display areas 151A and 151B are combined along a drag path. Then, the information 411B associated with the first screen varies and thus is displayed in an increased size on the combined extension display area.

Specifically, a first portion (an upper portion) of the information 411B associated with the first screen is displayed on the first extension display area 151A, a second portion (a lower portion) of the information 411B associated with the first screen is displayed on the second extension display area 151B. That is, the first and second extension display areas 151A and 151B are used as if they were one screen, and thus the user can check the information 411B associated with the first screen in a large size while the mobile terminal 100 remains in the closed state. In FIG. 4, in a case where an event is received in an application that corresponds to the first screen 401, information (for example, contents of a message received) 413 associated with the event can be checked in a larger size using a drag touch input.

To do this, the controller 180 controls a drive circuit of a display panel and thus adjusts frames of image data in such a manner that a size of image data which corresponds to the information that is output only to the first extension display area 151A is increased. In addition, the controller 180 can control a graphic memory and a bitmap memory of the drive circuit in such a manner that the image data is output to the second extension display area 151B, as well as to the first extension display area 151A. In addition, the controller 180 can perform control in such a manner that start coordinates of varied information are set in the first and second extension display areas 151A and 151B. This operation can be performed in real time as soon as the drag touch input described above is applied.

According to the embodiment that is described above, the user can more easily check the information that is output to a narrow area, using the combined extension display area, while the mobile terminal 100 remains in the closed state.

This is useful in that, in a state where the information associated with the first screen is an image, such as a facial photograph, the information is checked in a big size without opening the terminal. In addition, batter power consumption is also reduced because the inside-surface display area remains in an OFF state.

FIG. 5 is a flowchart for describing a representative operation that is realized in the mobile terminal according to the present invention, which will be described below.

With reference to FIG. 5, in the state where the mobile terminal 100 is opened, a step of displaying the first screen on the inside-surface display area 151 that is positioned on the inside surfaces of the first and second bodies is started (S10). At this point, no limitation is imposed on a type of first screen. In addition, in a case where the inside-surface display area 151 is folded with the hinge unit serving as an axis, different types of screens can be provided to both areas.

While the first screen is displayed on the inside-surface display area, when the folding event occurs (S20), the information associated with the first screen is displayed to any one of the first and second extension display areas 151A and 152B of the mobile terminal 100 (S30).

In one embodiment, when the information associated with the first screen is displayed on the condition that an angle that is formed between the first and second bodies with the hinge unit serving as an axis should be reduced to within a predetermined range, the inside-surface display area can switch to an inactivated state (that is, an OFF state).

Thereafter, when the mobile terminal 100 switches to the closed state and thus the first and second extension display areas 151A and 151B comes into proximity with each other, an icon indicating that the first and second extension display areas are combinable is displayed (S40).

On the other hand, in the state where the mobile terminal 100 is closed, in a case where the associated information is displayed when an event occurs in at least one application or a touch is applied to any one of the first and second extension display areas, the steps S10, S20, and S30 described above can be omitted.

Next, when the drag touch input is applied to the icon, the information associated with the first screen is varied based on the drag touch input, and thus can be displayed on the combined extension display area (S50). In one embodiment, the icon can be generated in the border of the first and second display areas. In this case, an image that is gradually transformed along the drag path of the drag touch input can be displayed within the icon.

In addition, in one embodiment, interaction with the user can be performed depending on whether the icon is dragged in a first direction or in a second direction that is opposite to the first direction. For example, while the icon is dragged in the first direction, an image can appear as if a zipper is pulled up, in such a manner that the first and second extension display areas are shown to be combined. On the other hand, while the icon is dragged in the second direction, an image can appear as if a zipper is pulled down, in such a manner that the combined extension display area is separated back.

Alternatively, the interaction with the user may be performed by using a method in which the image of the icon itself is moved along the drag path or varies in length. In this case, the icon can vary in length while performing highlighting processing on an area to which the information is output, in order to indicate a current dragging direction or to show that the pieces of the information that are output to the pre-drag path are combined or the combined information is separated. That is, for guidance, the combination of the extension display areas or the separation of the combined extension display area can be visually indicated.

In addition, when the first and second extension display areas are combined based on the drag touch input that is applied to the icon, the controller 180 can control the combined extension display area in such a manner that a display position and a size of the information associated with the first screen vary around the border of the first and second extension display areas. For example, when the extension display areas are combined, the first portion and the second portion of the information that is output only to the first extension display area can be output to the first extension display area and the second extension display area, respectively.

As described above, the user can more easily check the information that is output to a narrow area, using the combined extension display area.

FIGS. 6A to 6D each introduce a method of controlling the combined display area and illustrate an example for describing processing of the combined display area in a case where the mobile terminal 100 switches from the closed state to the opened state.

Figure 6A:
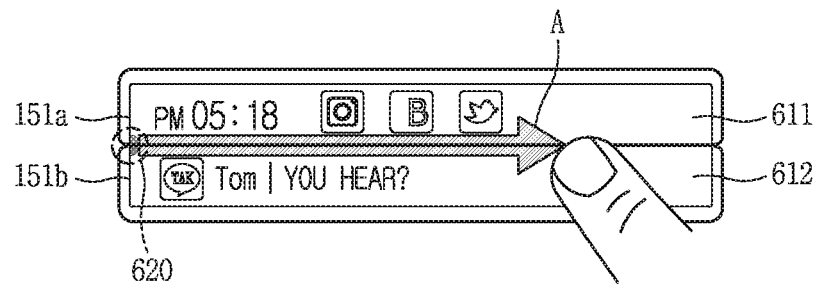

In one example, as illustrated in FIG. 6A, icons 611 for applications that correspond to the execution screen that is output to the inside-surface display area 151 can be output, as the information associated with the first screen, to the first extension display area 151A. Then, information (for example, a message received) 612 associated with an event that occurs in each of the applications described above can be output to the second extension display area 151B.

At this time, the icons 611 for the applications and the information 612 associated with the event that occurs in each of the applications described above are all associated with each other, and can be said to form pieces of partial information in a first group.

Figure 6B:
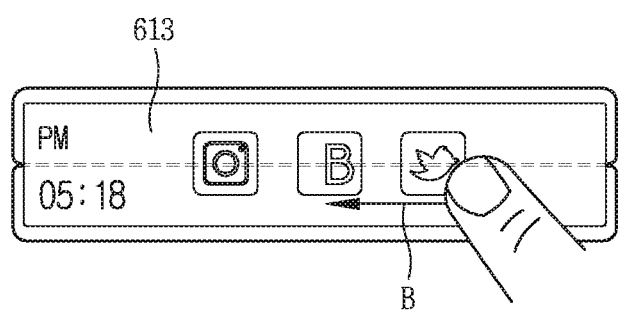

When a touch that is applied to a combination icon 620 that is displayed on the border of the first and second extension display areas 151A and 151B is dragged in a direction in which the icons 611 for the applications are output, as illustrate in FIG. 6B, sizes of the icons 611 for the applications are increased and are output over the entire combined extension display area (613). At this time, the information associated with the event, which is output to the second extension display area 151B before combination, disappears without being displayed.

In this case, a touch-effective area for selecting a specific icon from among the icons 611 for the applications is also increased, and therefore the number of times that the specific icon is erroneously selected is reduced and an execution screen of a desired application is easier to switch to.

In addition, although not illustrated, when the extension display areas are combined, the integration of the areas may be shown by applying the same background image to the first and second extension display areas. At this point, the same background image is achieved by using the same color, displaying one emotional image that is connected to the entire integrated area, displaying hour and minute of the time information separately, or by doing things like these.

On the other hand, when the information associated with the event, which is output to the second extension display area 151B before combination, needs to be checked, this can be achieved by performing short flicking touch input in the same direction as, or the opposite direction to the drag touch input.

For example, in FIG. 6B, when flicking touch input toward the left side is applied to the combined extension display area, icons 613 from varied applications are slid as the flicking touch input is applied, information 614 associated with an event varied appears in the combined extension display area. When the flicking touch input is successively applied, information to be output the next time, or the previous icon 613 for the varied applications can appear in the combined extension display area.

In addition, although not illustrated, the icons 613 for the varied applications and the information 614 associated with the varied event may be output to the combined extension display area sequentially or alternately according to designated order (for example, a display position or the like).

Figure 6C:
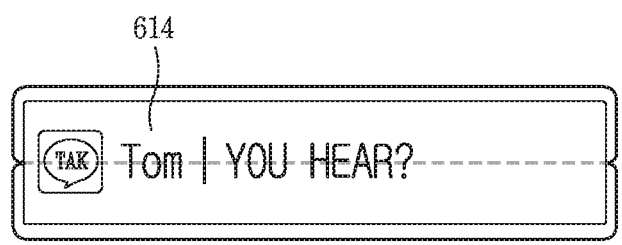
Figure 6D:
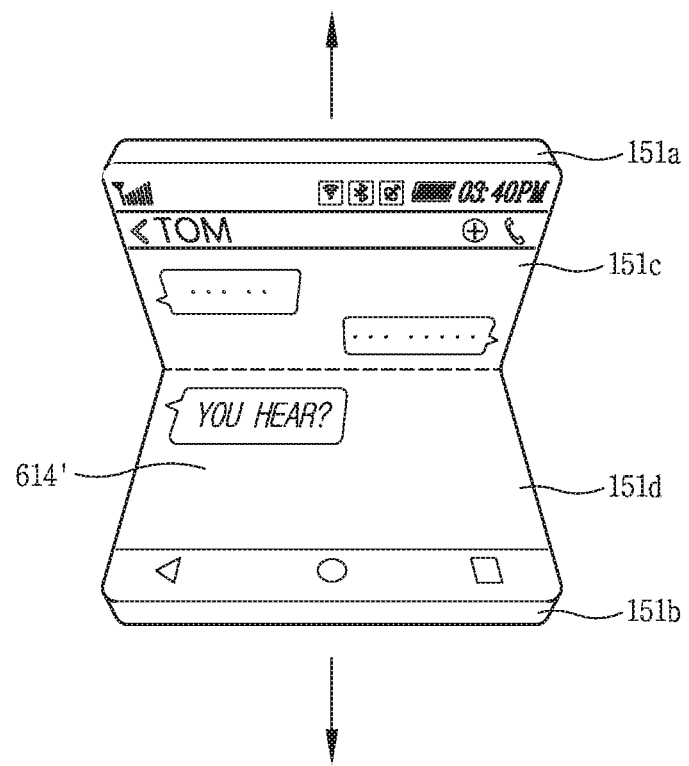

In addition, in one embodiment, in a state where the size-varied information is displayed on the combined extension display area 151A and 151B, when an opening event is detected, the combined extension display area is separated and the size and the position of the varied information are restored to their initial size and position. Then, as illustrated in FIG. 6B, when the mobile terminal 100 switches to the partly-opened state, a conversation window screen 614 is output, as an execution screen of an application that corresponds to the information 614 that is illustrated in FIG. 6C, to the inside-surface display areas 151C and 151D.

At this time, although not illustrated, when the combined extension display area is separated according to the opening event, a visual effect can be output as if the information 614 associated with the varied event disappeared into the inside-surface display area 151C or 151D that extends from the extension display area that results from the separation. Along with this, the extension display area can switch to the inactivated state.

As described above, when the mobile terminal 100 switches from the closed state to the opened state, the combined extension display area is naturally separated to be restored to its previous state. However, when the mobile terminal 100 switches back to the closed state within a predetermined time (for example, one to two seconds) after the opening event occurs, restoring back to the state of the combined extension display area may take place.

Figure 7A:
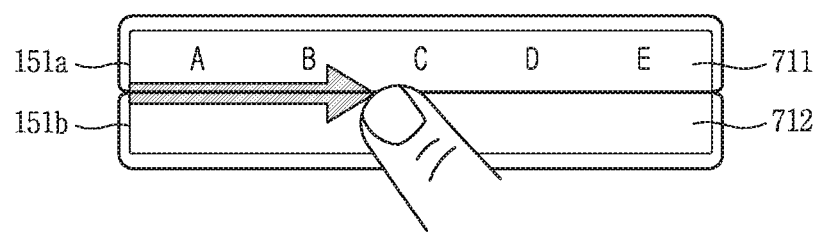
Figure 7B:
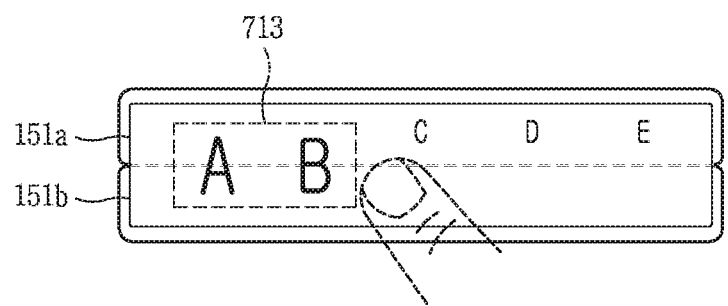

In addition, in one embodiment, the extension display areas can be gradually combined. Specifically, the information that is output to any one of the first and second extension display areas 151A and 151B can vary gradually along the drag path of the drag touch input that is applied to the combination icon. For example, with reference to FIGS. 7A and 7B, in a state where "A, B, C, D, and E" are sequentially displayed on the first extension display area 151A, in a case where the drag touch input that is applied to the border of the first and second extension display areas 151A and 151B is dragged up to a position to which "B" is output, and then is released, only "A and B" that are included in the drag path vary (713) and the remaining "C, D, and E" remains in a previously-displayed state. That is, only the extension display areas on which "A and B" are displayed are combined, and the extension display area on which "C, D, and E" are displayed can be said to remaining in a separated state.

Figure 7C:
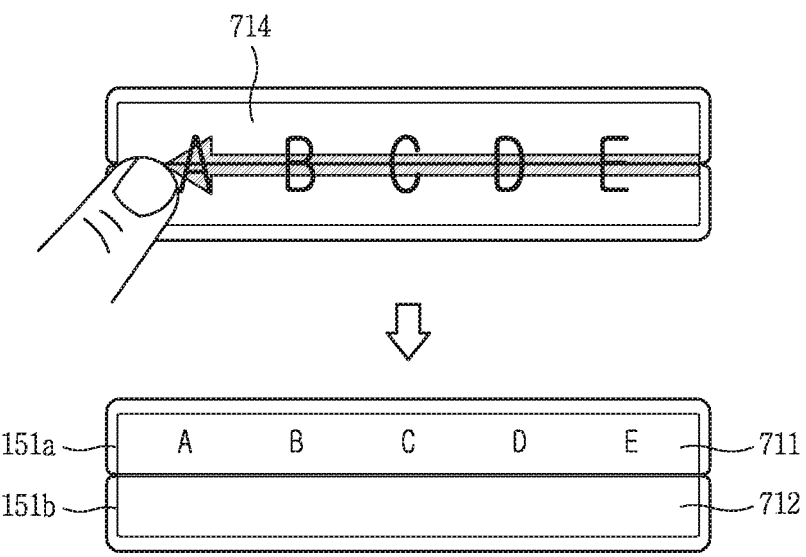

As another example, FIG. 7C illustrates a method of separating the combined extension display area without opening the mobile terminal 100.

Specifically, in a state where information (714) that is changed is displayed on the combined extension display area, when second drag touch input in a direction that is opposite to a direction of the drag touch input is applied, the controller 180 can perform control in such a manner that the changed information is restored to its initial state for display on any one of the first and second extension display areas 151A and 151B.

At this time, the restoration of the changed information to its initial state does not mean that the restored information is necessarily output as the same image as before at the same position as before. For example, in FIG. 7C, the restored information is displayed on the first extension display area 151A and the second display area 151B remains empty, but in reverse, the pieces of restored information ("A, B, C, D, and E") may be displayed on the second extension display area 151B, and may be displayed as different images (for example, lower cases "a, b, c, d, and e"). At this time, the extension display area on which the restored information is not displayed can switch to the inactivated state.

In addition, while the second drag touch input described above is performed on the combined extension display area, a second icon that includes an image which varies along the drag path of the second drag touch input can be displayed, in which case the second icon can be named as a separation icon. In addition, even in this case, the examples that are applied to the combination icon can be in the same or similar manner. As one example, the restored information can be gradually displayed along the drag path of the drag touch input that is applied to the separation icon.

Figure 7D:
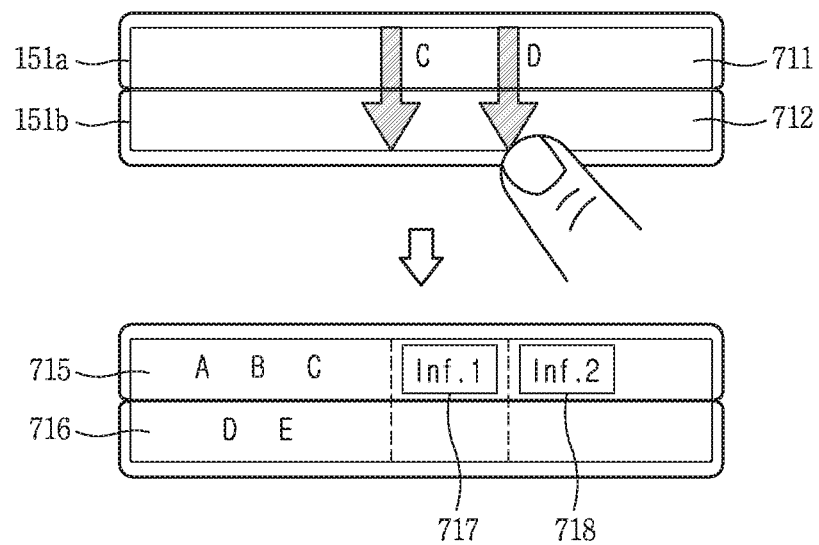

The embodiments are described above in which, with respect to the first and second bodies, the first and second extension display areas are combined and the combined extension display area is separated. That is, the first and second extension display areas are described as being separated only in the row direction, but as illustrated in FIG. 7D, the extension display area may be separated in the column direction.

Specifically, when the drag touch input that divides the first and second extension display areas 151A and 151B in the column direction is applied, the first and second extension display areas 151A and 151B are divided into the column direction and thus multiple sub-display areas are generated. For example, in FIG. 7D, when like C and D, the drag touch input that is applied in the column direction is performed, multiple sub-display areas that result from the partitioning by the drag touch inputs C and D are generated, at which time partitioning lines may be displayed along the drag paths of the drag touch inputs C and D.

In addition, along with the information that is previously output, pieces of additional information 717 and 718 associated with the information is further displayed on one of the areas that result from the partitioning, that is, on one of the multiple sub-display areas that are generated. In addition, the information that is previously output is output to smaller-sized display areas 715 and 716 that result from the areas partitioning.

In this state, when the drag touch input is applied in the column direction that is opposite to the C and D described above, or the drag touch input is applied to the combination icon, many sub-display areas are immediately combined and sizes of the pieces of information A, B, C, D, and E are increased for display.

The various methods of controlling information depending on the combination of the extension display areas and the separation of the combined extension display area are described above. Now, various examples associated with performing of an option function that is designated at the time of the combination of the extension display areas are described.

Figure 8A:
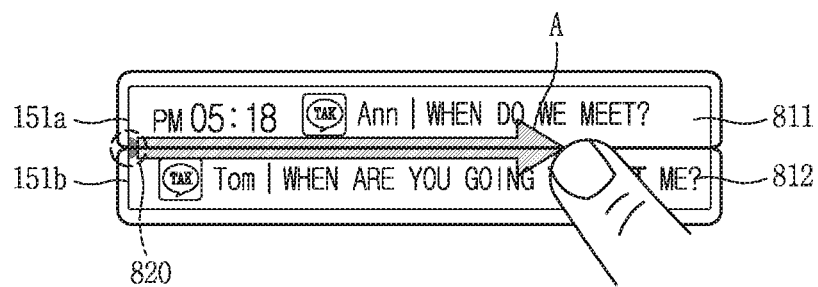
Figure 8B:
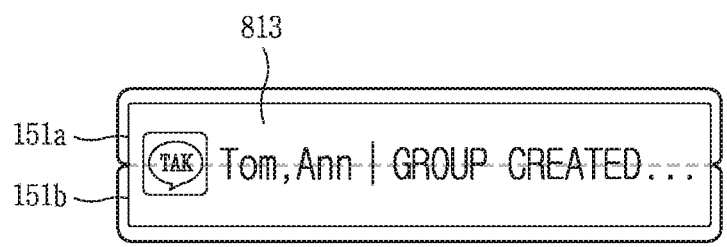

To do this, in a state where partial information in the first group associated with the first screen is displayed on each of the first and second extension display areas 151A and 151B, when a predetermined drag touch input is applied to the combination icon, the controller 180 of the mobile terminal 100 can perform a function associated with the integration of pieces of partial information in the first group. Thereafter, a result of performing the function can be provided to the combined extension display area. As one example, FIGS. 8A and 8B illustrate an example in which items of content that are output to the areas, respectively are combined at the same time that the first and second extension display areas are combined. In FIG. 8A, in a state where a message that is received in a first conversation window is displayed on the first extension display area 151A, and a message that is received in a second conversation window is displayed on the second extension display area 151B, it can be detected that the drag touch input is applied to a combination icon 820.

Then, a group conversion room in which a user ("Tom") in the first conversation window and a user ("Ann") in the second conversation window are recognized as conversation partners is established at the same time that the extension display areas are combined. Accordingly, as illustrated in FIG. 8B, the group conversation room is displayed on the combined extension display area. In this state, the user can open the mobile terminal 100, and can immediately perform a conversation in the group conversation room.

In addition, in one example, according to a second drag touch input that is opposite in direction to the drag touch input to the combination icon 820, an exit from the established group conversation room can be performed. That is, the performing of the function associated with the integration can be canceled.

In addition, the controller 180 can limit a function of combining items of content, which is applied when the extension display areas are combined, to a case where a similarity between items of content that are output to the first and second extension display areas, respectively, exceeds a predetermined critical value. For example, as illustrated in FIG. 8A, in a case where similar messages or messages associated with the same topic are received from the user ("Tom") in the first conversation window and the user ("Ann") in the second conversation window, the limitation can be imposed in such a manner that the function of combining items of content is performed.

Figure 9A:
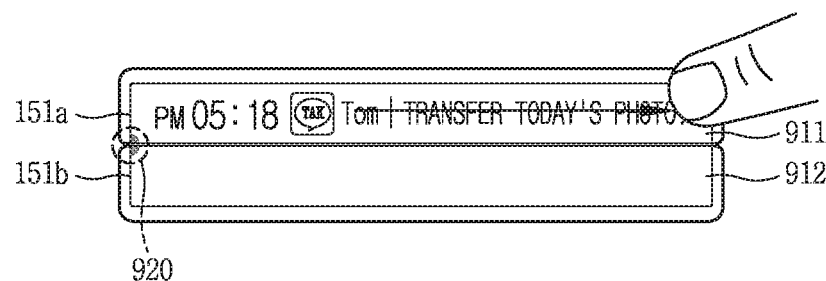
Figure 9B:
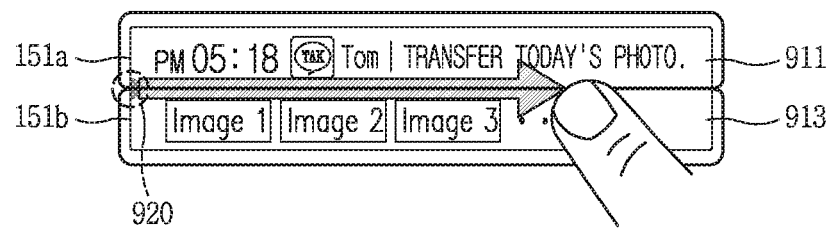
Figure 9C:

As another example, in FIGS. 9A, 9B, and 9C, in the close state of the mobile terminal 100, a function of fast transferring content that is output to the extension display area can be performed using the drag touch input.

First, as illustrated in FIG. 9A, in a case where a message 911 that is received in a message application is displayed on the first extension display area 151A, when the drag touch input is applied like the received message 911 is read, the controller 180 can recognize an execution command that is included in the received message 911. Accordingly, the controller 180 can recognize that the execution command "Transfer the photograph that is taken today" is input.

Thereafter, the controller 180 provides the second extension display area 151B with a search result 913 associated with execution of the recognized execution command, for example, "thumbnails of the today-taken photographs that are to be transferred." In this state, when the drag touch input is applied to a combination icon 920, photographs that correspond to the thumbnails 913 which are displayed on the second extension display area 151B is transferred to the other party, the terminal that sends the message 911. Then, a photograph transfer result 914 is displayed on the combined extension display area.

FIGS. 10A and 10B each illustrate an example in which one or several of the search results that are provided to the second extension display area 151B.

First, with reference to FIG. 10A, while a thumbnail 1012 is displayed, as the search result, on the second extension display area 151B, an alerting message (for example, "transfer images by dragging") 1013 that guides the user through execution of a transfer function can be substituted for the message 911 that is output to the first extension display area 151A. When the drag touch input is applied in response to the alerting message 1013, images that correspond to the thumbnails 1012, respectively, are immediately transferred to the other party, the terminal that sends the message 911.

FIG. 10B illustrates that before performing the drag touch input, one or several images are selected from among multiple thumbnails that are output as the search results. While the touch input is applied to a first thumbnail 1021 and a third thumbnail 1023, thumbnails of which sizes are temporarily increased can be temporarily displayed for checking images. When the touch input that is applied to the first thumbnail 1021 and the third thumbnail 1023 is dragged toward the first extension display area 151A, the image is selected as an image to be transferred. Selection marks 1021' and 1023' are output to the selected first and third thumbnails, respectively.

Thereafter, when the drag touch input or a predetermined drag touch input is applied to the combination icon 920, only images that correspond to the first and third thumbnails, respectively, are selectively transferred while the extension display areas are combined.

Next, with reference to FIGS. 11A, 11B, 11C, 11D, and 11E, a sequence of processes will be specifically described in which photographing, editing of an image captured, storing the edited image, and re-photographing are performed using the extension display area in the folded state of the terminal while the mobile terminal 100 remains in the closed state.

First, here, a camera 121 of the mobile terminal 100 is positioned to the side of the hinge unit 104 that connects a first body 101A and a second body 101B to each other in such a manner that the photographing is performed in the closed state of the mobile terminal 100.

The camera 121 processes video frames of a still image or a moving image that are obtained by an image sensor in a photographing move or a video communication mode. The processed video frames can be displayed on the extension display area 151A or 151B, and can be saved in a memory 170. On the other hand, a camera module can be additionally mounted on the inside surface of the terminal body. In this manner, in a case where a camera module is additionally mounted, this camera module can be realized as a camera of which photographing direction is substantially opposite to the photographing direction in the camera 121, and which has different pixels than the camera 121.

When the camera 121 is activated in the state where the mobile terminal 100 is closed, a photographing function is performed. Accordingly, a photographing button 1101A and a small-sized preview image 1102 are provided in the first extension display area 151A. In addition, in order to reduce the inconvenience due to limitation on the preview image, a guidance message 1103 for maintaining horizontal balance can be output to the second extension display area 151B. In one example, when the horizontal balance is maintained, a feedback signal, such as sound or vibration, can be output.

Figure 11A:
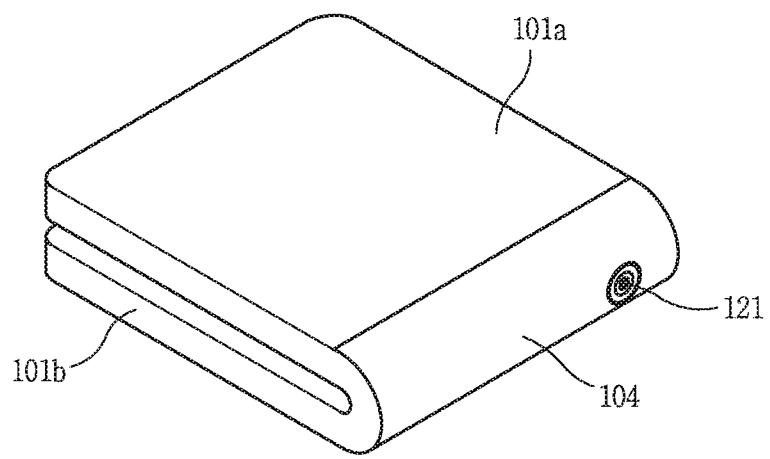
Figure 11B:
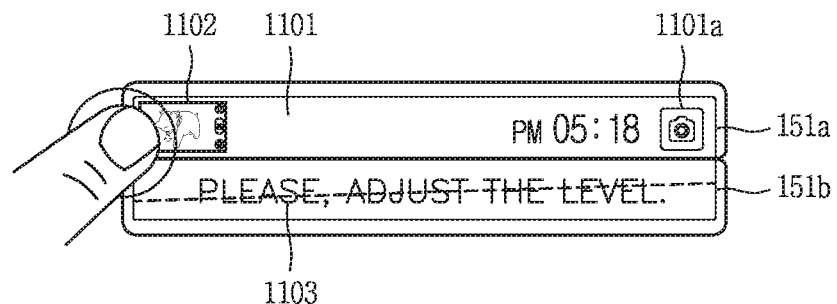
Figure 11C:
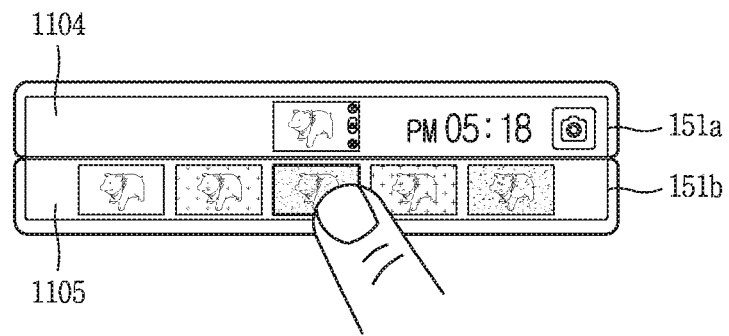

When the photographing is performed using the photographing button 1101A, the captured image is output to the first extension display area 151A. At this time, when the captured image 1102 is selected, as illustrated in FIG. 11C, a list 1105 of filters that are applicable to the captured image is provided in the second extension display area 151B.

Figure 11D:
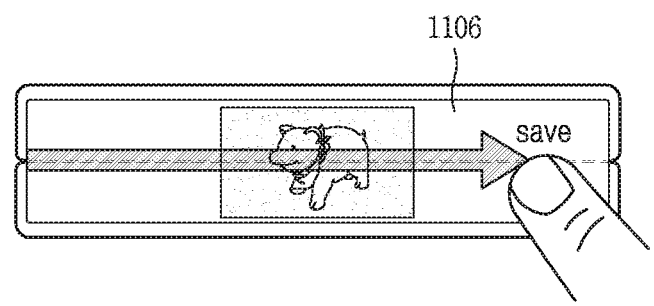

After a specific filter is selected, when the drag touch input described above is applied, the filter is applied to the captured while the extension display areas are combined (performance of a first function). Thereafter, as illustrated in FIG. 11D, when the drag touch input is additionally applied, the image to which the filter is applied is saved in a space designated (performance of a second function) (1106). Here, a function of saving an image varied is performed according to the attribute of a camera application, but a function transferring or uploading an image may be performed according to a type of application.

Figure 11E:
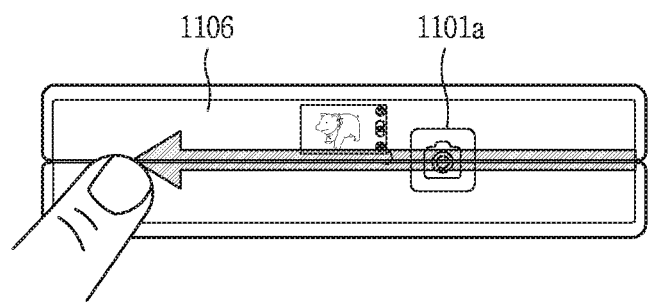

On the other hand, while the performing of the first or second function is in progress, when the second drag touch input in the direction that is opposite to the direction of the drag touch input described above is applied to the combined extension display area, a graphic object which indicates that performing of a function designated is canceled and the combined extension display area is separated can be output. As a result, as illustrated in FIG. 11E, switching back to the photographing can take place (1106).

FIGS. 12A, 12B, 12C, and 12D each illustrate an example in which partial combination processing is performed based on the touch input that is applied to a specific information which is output to the extension display area that results from the separation, which will be described below.

Figure 12A:
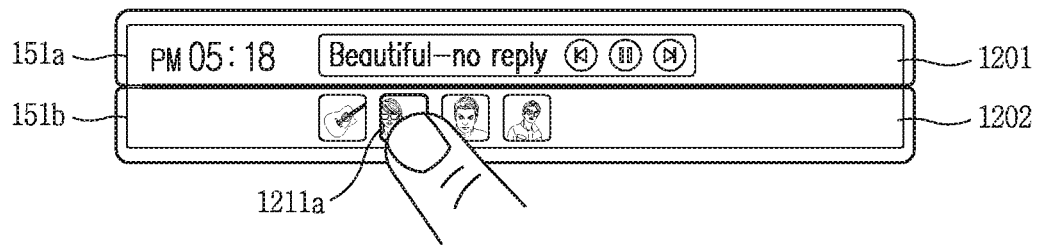
Figure 12B:
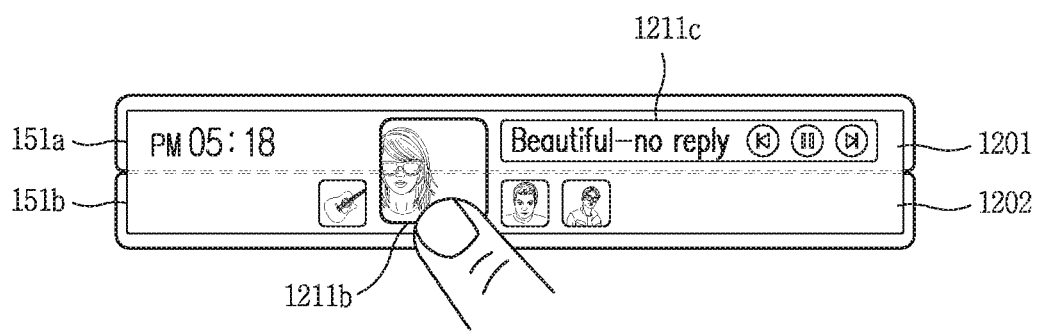

FIGS. 12A and 12B each illustrate an example in which first information (for example, a sound source reproduction bar) 1201 associated with sound source reproduction content and second information (for example, a list of reproducible sound sources) 1202 are output to the extension display areas 151A and 151B that result from the separation, respectively. In this state, when the touch is applied to a specific sound source image 1211A, the partial combination processing is performed only on the area, and thus the size of the specific sound source image 1211A is increased (1211B). At this time, a position of the sound source reproduction bar 1201 that is output to the first extension display area 151A can be moved not to be covered by a sound source image 1211B of which the size varies (1211C).

Figure 12C:
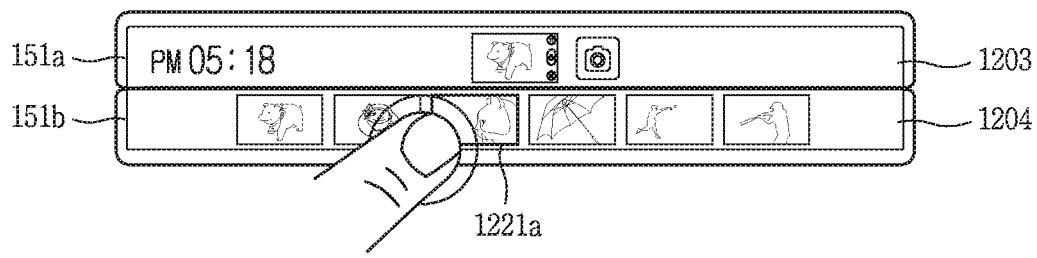
Figure 12D:
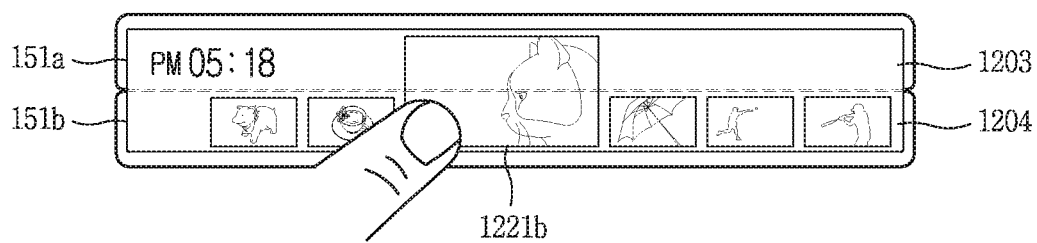

Then, FIGS. 12C and 12D each illustrate an example in which the first information (for example, the immediately-preceding captured image) 1203 associated with photographing content and the second information (for example, a list of images saved) 1204 are output to the extension display areas 151A and 151B that result from the separation, respectively. In this state, when the touch is applied to a specific image 1221A, the partial combination processing is performed only on the area, and thus the size of the specific image is increased for outputting (1221B).

Figure 13A:
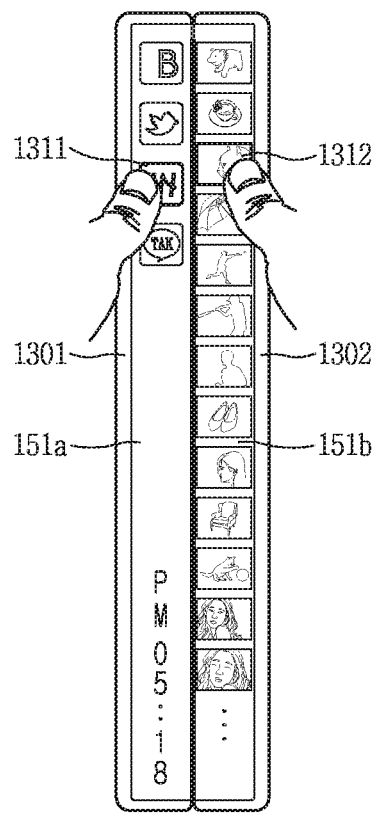
FIGS. 13A, 13B, and 13C are conceptual diagrams associated with control of an inside-surface display area that uses information which is displayed on the extension display area in the mobile terminal according to the present invention.
Figure 13B:
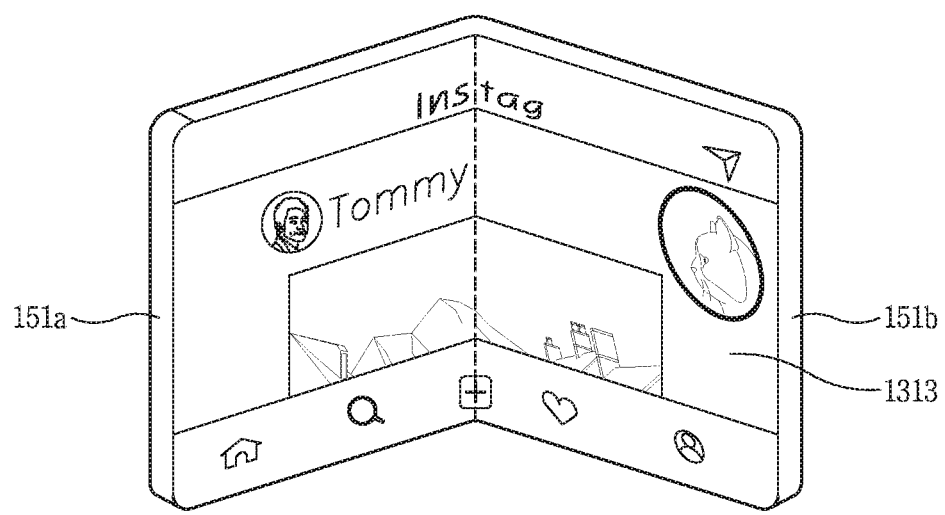
Figure 13C:
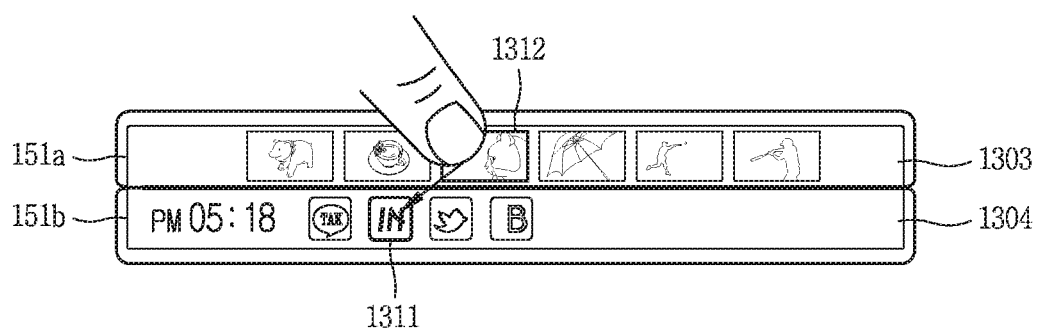

An example of this increase in size by the partial combination processing is illustrated in FIGS. 13A, 13B, and 13C. In a case where a first mage 1311 is selected in the first extension display area 151A, and at the same time a second image 1312 is selected in the second extension display area 151B, combination of items of content is performed while with the partial combination processing, at least one portion of the varied first image and one portion of the varied second images overlap.

In this state, when the mobile terminal 100 is opened as illustrated in FIG. 13B, a screen 1313 for a result of the combination processing the first and second images is immediately displayed on the inside-surface display area. For example, a screen for an execution step of immediately uploading the second image 1312 is output to an execution screen of an application that corresponds to the first image 1311.

In a case where, as illustrated in FIG. 13C, specific content 1312 is first selected from the first extension display area 151A and subsequently the drag toward a specific icon 1311 for a specific application in the second extension display area 151B is performed, the increase in size by the partial combination processing can also be achieved in the same manner.

Figure 14A:
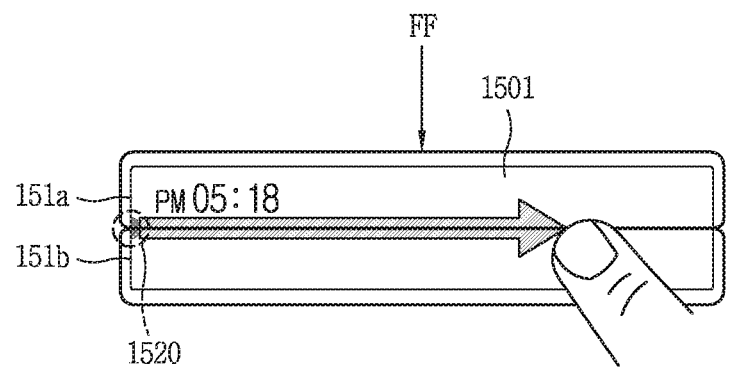
FIGS. 14A, 14B, and 14C are conceptual diagrams, each for describing an example in which, in the mobile terminal according to the present invention, different pieces of information are displayed on the extension display areas, respectively, according to a speed at which the opened mobile terminal is closed, and a sleeping mode is fast performed based on the touch input.
Figure 14B:
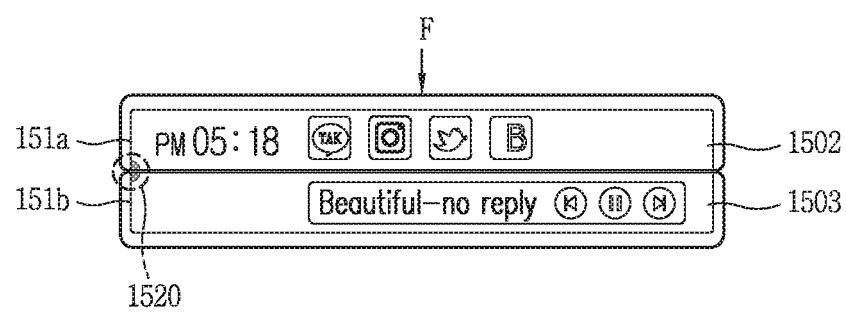
Figure 14C:
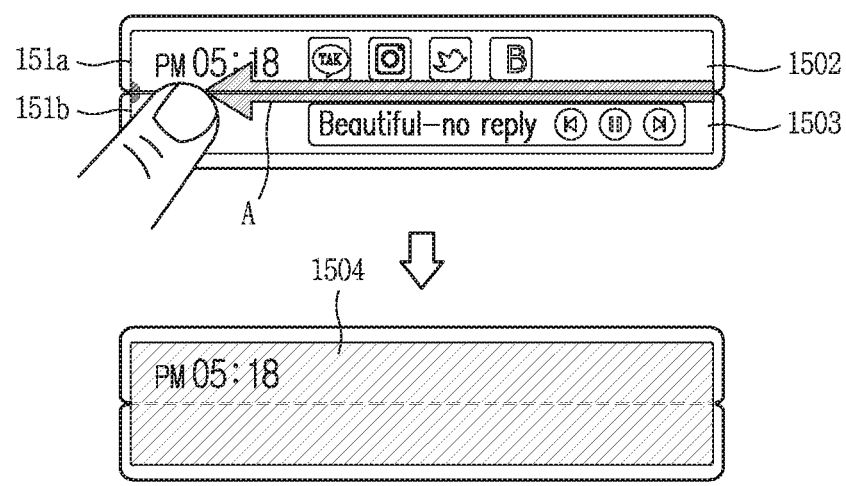

FIGS. 14A, 14B, and 14C are conceptual diagrams, each for describing an example in which, in the mobile terminal according to the present invention, different pieces of information are displayed on the extension display areas, respectively, according to a speed at which the opened mobile terminal is closed, and a sleeping mode is fast performed based on the touch input.

Here, when the mobile terminal 100 switches from the opened state to the closed state, the controller 180 can detect relative speeds of the first and second bodies, which correspond to the folding event. Then, the controller 180 can differently determine an amount of information associated with the first screen, which is to be output to the extension display area, according to the detected relative rotation speed.

FIG. 14A illustrates a case where the detected relative rotation speed is very high or a pressure for closing, which corresponds to the folding event, is high (FF). FIG. 14B illustrates a case where the detected relative rotation speed is lower than in FIG. 14A, or the pressure for closing, which correspond to the folding event, is lower than in FIG. 14A (F). As illustrated, it can be seen that the higher the detected relative rotation speed and/or the higher the pressure for closing, which corresponds to the folding event, the less the amount of information 1501 that is provided to the extension display area. In contrast, from FIG. 14B, it can be seen that an icon 1502 for an application and an indicator 1503 that indicates an immediately-preceding execution state are provided in the extension display area.

This serves the purpose of reducing the battery power consumption. That is, in a case where the user closes the terminal with much force, because it is determined that the terminal is reliably intended to be no longer used, switching to the sleeping mode takes place fast in order to reduce the battery power consumption. However, in FIG. 14A, based on the drag touch input that is applied to the combination icon 1520, a larger amount of information (for example, an icon for an application) can also be provided in the combined extension display area.

On the other hand, in one example, when the second drag touch input in the direction that is opposite to the direction of the drag touch input described above is applied with a predetermined time (for example, one to three seconds) after the folding event occurs, the switching to the sleeping mode 1504, as illustrated in FIG. 14C, can take place as soon as the combined extension display area is separated. Accordingly, even in a case where, as the terminal is closed with less force, a large amount of information is output to the extension display area (1502 and 1503), immediate switching to the sleeping mode is possible.

As described above, according to the mobile terminal and the method of controlling the mobile terminal according to the embodiment of the present invention, even in the state where the extension display areas are combined and the terminal is closed, useful information can be easily checked for. In addition, a function associated with a gesture for separating the combined extension display area or combining the extension display extension areas can be performed in an intuitive, fast manner.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A terminal comprising:
 a first body and a second body, wherein the first body and the second body are positionable between an open state and a closed state, wherein in the open state a first side of the first body and a first side of the second body are exposed and in the closed state the first side of the first body faces the first side of the second body, and wherein the first body has an edge that extends from the first side of the first body and the second body has an edge that extends from the first side of the second body;
 a hinge connecting the first body with the second body, wherein the hinge permits positioning of the first body and the second body;
 a display comprising a first display region located on the first side of the first body and the first side of the second body, wherein the display further comprises second and third display regions which each extend from the first display region and which are respectively located at the edges of the first and second bodies; and
 a controller configured to:
 cause the display to display a first screen on the first display region when in the open state;
 cause the display to display information associated with the first screen on the second display region in response to switching from the open state to the closed state;
 cause the display to display an icon on either or both of the second or third display regions while in the closed state, wherein the icon is displayed in association with the information displayed on the second display region;
 cause the display to stop displaying the information associated with the first screen on the second display region and to display the information on a combined display region that includes both the second display region and the third display region, in response to an input received with regard to the icon, and
 vary display position and size of the information relative to a border of the second and third display regions, in further response to the input.

2. The terminal of claim 1, wherein the icon is displayed at a border of the second and third regions along a drag path of the received input.

3. The terminal of claim 1, wherein the controller is further configured to:
 when the input is received while partial information of a first group associated with the first screen is displayed on each of the second and third display regions, vary the partial information according to a designated order and cause the display to display the varied partial information on the combined display region; and
 vary next partial information of first group for display, based on a preset touch gesture received at the combined display region.

4. The terminal of claim 1, wherein the information associated with the first screen varies along a drag path of the input.

5. The terminal of claim 1, wherein the controller is further configured to:
 cause the display to stop displaying the information associated with the first screen on the combined display region and display the information on one of the second or third display regions, in response to a drag input that is in a direction that is opposite that of a direction of the input received with regard to the icon.

* * * * *